United States Patent Office 2,806,874
Patented Sept. 17, 1957

2,806,874
MIXED ISOMERIC OCTEN-1-OLS AND THEIR PREPARATION

Joseph Donald Surmatis, Pompton Plains, N. J., assignor to Hoffmann-La Roche Inc., Nutley, N. J., a corporation of New Jersey No Drawing. Application February 24, 1955, Serial No. 490,434

10 Claims. (Cl. 260—488)

This invention relates to novel chemical compounds useful as odor-imparting agents in the preparation of perfumes and of scented compositions generally, and to novel processes and novel intermediates useful in making such odor-imparting agents. More particularly, it relates to novel compounds which may be characterized as esters of lower alkanoic acids with certain acyclic monohydric mono-olefinic alcohols, said esters having the formula

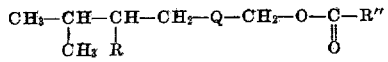

as hereinafter more precisely defined; and to intermediates and processes useful in making said novel compounds.

A quick survey of the invention is afforded by the following flow sheet, wherein:

—R signifies hydrogen or methyl.
—R' signifies a radical (e. g. lower alkyl, such as methyl or ethyl, or monocyclic hydrocarbon aryl, such as phenyl) forming part of the ester group

—COR'
‖
O

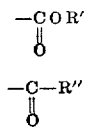

represents the acyl radical of a lower alkanoic acid; the constituent radical R" of which represents hydrogen or an alkyl radical having not more than six carbon atoms.

—Z represents a monovalent non-hydroxylic halogen-containing acid radical of an inorganic acid, for example, a halo radical or a dihalophosphato radical. Preferably, the inorganic acid is selected from the group consisting of hydrochloric acid, hydrobromic acid, and dichlorophosphoric acid, so that Z preferably represents chloro, bromo or dichlorophosphato.

—Q represents a branched chain alkenylene radical having the empirical formula —C₄H₆—.

I  CH₃—CH—CH—CH₂—CH₂—C=O
     |     |                |
     CH₃   R                CH₃

6-methyl-(or 5,6-dimethyl-)2-heptanone

II 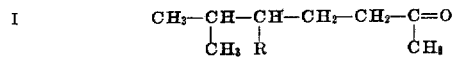

ester of 3,7-dimethyl-(or 3,6,7-trimethyl-)2,3-epoxy-1-octanoic acid

III 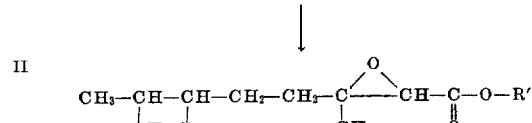

3,7-dimethyl-(or 3,6,7-trimethyl-)1,3-octanediol

IV 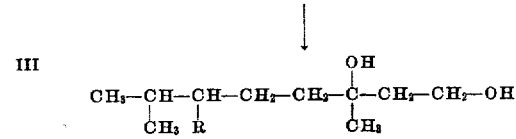

1-lower alkanoyloxy-3,7-dimethyl-(or 3,6,7-trimethyl-)3-hydroxy-octane

V 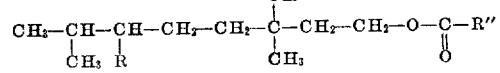

1-lower alkanoyloxy-3-dichlorophosphato-(or chloro-, or bromo-)3,7-dimethyl-(or 3,6,7-trimethyl-)octane VI 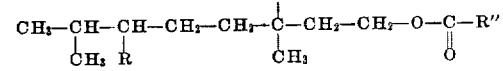

VII 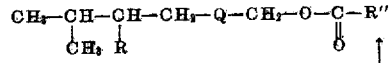

It will be apparent from the above flow sheet that the process above disclosed starts from (I) either of the known compounds 6-methyl-2-heptanone or 5,6-dimethyl-2-heptanone. One comprehensive procedure herein described comprises treating (I) by a Darzens reaction to produce the corresponding glycidic ester, i. e. an ester of 3,7 - dimethyl-(or 3,6,7-trimethyl-)2,3-epoxy-1-octanoic acid (II); reducing the latter (e. g. with lithium aluminum hydride or with sodium and alcohol) to form 3,7-dimethyl-(or 3,6,7-trimethyl-)1,3-octanediol (III); reacting (III) with an approximately equimolar proportion of an acylating agent appropriate to introduce the desired lower alkanoyl radical

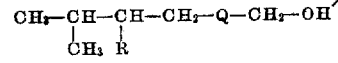

such as an acid or an acid halide or an acid anhydride, e. g. formic acid or acetyl chloride or isobutyric anhydride, thus producing 1-lower alkanoyloxy-3,7-dimethyl-(or 3,6,7-trimethyl-)3-hydroxyoctane (IV); reacting (IV) with an approximately equimolar proportion of an inorganic acid esterifying agent appropriate to introduce the desired inorganic acid radical —Z, for example hydrochloric acid, hydrobromic acid, phosphorus oxychloride or phosphorus oxybromidedichloride, thus forming the mixed organic-inorganic ester of Formula V; treating (V) to split out its inorganic acid content, i. e. H. and Z, suitably by heating in the presence of an acid acceptor, e. g. a tertiary organic base such as pyridine, dimethylaniline or the like, or an inorganic base such as sodium bicarbonate, thus forming the novel ester (VI). If desired, the ester (VI) may be hydrolyzed, e. g. by saponification with aqueous-alcoholic potassium hydroxide, to produce the alcohol (VII).

It will be apparent from the above flow sheet that the novel esters of Formula VI above are formed by elimination of the elements of the inorganic acid HZ from the mixed organic-inorganic ester represented by Formula V. Accordingly, the branched chain alkenylene —C₄H₆— radical Q, which is a part of the ester product of Formula VI and which is formed by elimination of HZ from the moiety

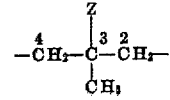

of the mixed organic-inorganic ester (V) (the superscripts indicate position of the carbon atoms in said moiety, with reference to the terminal oxy group in the ester (V)) may have any of the following three structures:

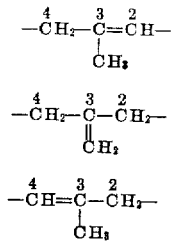

All of these structures are present in the products (VI) and (VII). Accordingly the alkenols $C_{10}H_{20}O$ and $C_{11}H_{22}O$ constituting the alcohol product (VII) respond to the structures:

3,7-dimethyl-(or 3,6,7-trimethyl)-2-octen-1-ol
7-methyl-(or 6,7-dimethyl)-3-methylene-1-octanol
3,7-dimethyl-(or 3,6,7-trimethyl)-3-octen-1-ol.

Accordingly, the esters (VI) may be considered from a structural point of view (and irrespective of the actual process used in their preparation) as being formed by esterification of said alkenols $C_{10}H_{20}O$ or $C_{11}H_{22}O$ by a lower alkanoic acid R″COOH, e. g. formic acid, acetic acid, n-propionic acid, isobutyric acid, α,α-dimethylbutyric acid, n-heptylic acid and the like.

In addition to the method disclosed above for making the novel odor-imparting agents designated by the Formula VI, an alternative method comprises esterifying the alcohols of Formula VII with an acylating agent appropriate to introduce the acyl radical of the desired acid R″COOH, such acylating agents including the acids themselves, their halides and their anhydrides.

A preferred group of odor-imparting agents among those compounds of the invention having Formula VI above comprises those esters wherein R represents hydrogen or a methyl group, and R″ represents isopropyl. These isobutyroxy esters are especially valuable as odor-imparting agents for use in compounding perfumes and scented compositions of the muguet, rose and lilac types.

The invention is further disclosed in the following examples, which are illustrative but not limitative thereof:

Example 1

To a 2-liter, 3-necked flask, equipped with a stirrer and a thermometer, there were added 512 g. of 6-methyl-2-heptanone and 610 g. of ethylchloroacetate. The solution was cooled to −10° C., then 324 g. of sodium methylate was added portionwise in four hours. During the addition, the temperature was kept at −10 to 0° C. The mixture was then washed twice with one liter of water, dried over anhydrous calcium sulfate, and distilled under vacuum. The ethyl 3,7-dimethyl-2,3-epoxy-1-octanoate which was obtained boiled at 80–85° C. at 0.4 mm., $n_D^{25}=1.412$.

Example 2

In a 12-liter, 3-necked flask equipped with a stirrer, dropping funnel and thermometer, there were charged 109 g. of lithium aluminum hydride and 3 liters of diethyl ether. To the stirred suspension there was added at 0° C. a solution of 612 g. of ethyl 3,7-dimethyl-2,3-epoxy-1-octanoate in three liters of diethyl ether. The addition was completed in three hours, and the stirring was continued three hours longer. Excess lithium aluminum hydride was carefully decomposed with water, the mixture was then poured into a 5 percent aqueous solution of sulfuric acid in order to dissolve the aluminum hydroxide formed. The aqueous layer was extracted three times, each time with one liter of petroleum ether. The combined oil layers were washed three times with water. The solvents were removed at reduced pressure. The 3,7-dimethyl-1,3-octanediol which was obtained had $n_D^{25}=1.451$.

Example 3

In a 5-liter, 3-necked flask fitted with a stirrer, thermometer and dropping funnel there were charged 496 g. of 3,7-dimethyl-1,3-octanediol, 3 liters of petroleum ether and 570 g. of dimethylaniline. The solution was cooled to −5° C. From a dropping funnel there was added 224 cc. of acetyl chloride in two hours. The cooling bath was then removed and the stirring was continued two additional hours, allowing the temperature to rise to room temperature. The mixture was washed with one liter of water, one liter of 5 percent aqueous sulfuric acid and finally with one liter of 5 percent sodium bicarbonate solution. The solvent was removed under vacuum. The 1-acetoxy-3,7-dimethyl-3-hydroxy-octane distilled at 110° C. at 0.8 mm., $n_D^{25}=1.441$.

Example 4

In a 5-liter flask fitted with a stirrer, condenser, thermometer and a dropping funnel, there were charged 1800 cc. of pyridine, 300 cc. toluene and 291 cc. of phosphorus oxychloride. 550 g. of 1-acetoxy-3,7-dimethyl-3-hydroxy-octane was added from a dropping funnel in one hour. The solution of 1-acetoxy-3-dichlorophosphato-3,7-dimethyl-octane thus formed was used directly for the procedure described in Example 5.

Example 5

The reaction flask containing the solution produced in Example 4 was heated at 95–100° C. for 4 hours while stirring. After cooling to room temperature, 2 liters of ice water was cautiously added. The oil layer was removed and washed twice with water. The solvent was distilled off at 100 mm. pressure and the product was fractionated under vacuum. The main fraction distilled at 68–70° C. at 0.85 mm., $n_D^{25}=1.438$. It was comprised essentially of the esters having Formula VI above formed by acetic acid with alkenols of empirical formula $C_{10}H_{20}O$. This product has a bland pleasant fragrance reminiscent of roses and is useful as an odor-imparting agent for perfumes.

Example 6

In a 5-liter flask fitted with a thermometer and dropping funnel, there were added 369 g. of the above identified product of Example 5 having $n_D^{25}=1.438$, 2 liters of ethyl alcohol, and a solution of 240 g. of potassium hydroxide in 500 cc. of water. The solution was stirred for four hours at 35–40° C. Two liters of water was stirred in and the oil layer which separated was removed. The aqueous layer was extracted three times, each time with one liter of petroleum ether. The combined extracts and oil layer were water-washed until neutral. The solvent was removed and the product was fractionated under vacuum. The main fraction, comprising essentially acyclic monohydric mono-olefinic alcohols of the Formula VII above and having the empirical constitution $C_{10}H_{20}O$, boiled at 61–63° C. at 0.5 mm., $n_D^{25}=1.450$.

Example 7

In a one-liter flask equipped with a stirrer and a thermometer, there was placed 100 g. of 1-acetoxy-3,7-dimethyl-3-hydroxy-octane and 390 cc. of 37 percent hydrochloric acid. The mixture was stirred for one hour at room temperature. The oil layer was separated from the aqueous layer, washed twice with water and dried over calcium chloride to yield 1-acetoxy-3-chloro-3,7-dimethyl-octane.

Example 8

The total amount of 1-acetoxy-3-chloro-3,7-dimethyl-octane produced in Example 7 was placed in a two-liter flask provided with a stirrer, thermometer and a reflux condenser. To this was added 350 cc. of pyridine and 150 cc. of toluene. The mixture was stirred at 95–100° C. for 48 hours. The reaction mixture was allowed to cool, and was then washed twice, each time with 500 cc. of water. After removing the solvent under vacuum, the product was fractionated. The main fraction distilled at 78–80° C. at 1.6 mm., $n_D^{25}=1.438$–$1.440$, and was essentially the same product as that obtained in Example 5.

Example 9

In a one-liter flask provided with a stirrer and a thermometer, there was placed 100 g. of the same material having $n_D^{25}=1.450$ obtained as the main fraction in Example 6 above, 118 g. of formic acid and 400 cc. of petroleum ether. The solution was stirred for two hours at reflux temperature. The reaction mixture was cooled to room temperature and washed with 500 cc. of water, 500 cc. of 5 percent aqueous sodium bicarbonate solution and finally with 500 cc. of water. On fractionation, there was obtained 92 g. of material distilling at 112° C. at 22 mm., $n_D^{25}=1.4390$. This material has a delicate fruity odor, and is useful as an odor-imparting agent. It is comprised essentially of the esters having Formula VI above formed by formic acide with alkenols of empirical formula $C_{10}H_{20}O$.

Example 10

To a three-neck, one-liter, round-bottom flask there was charged 78 g. of the same material having $n_D^{25}=1.450$ obtained as the main fraction in Example 6 above, 119 g. of isobutyric anhydride, and 160 cc. of pyridine. The solution was stirred for two hours at 60° C. The reaction mixture was washed with water, 5 percent aqueous sulfuric acid, 5 percent aqueous sodium carbonate, and finally with water. The product was dried over anhydrous calcium sulfate and fractionated. There was obtained 79 g. of ester material distilling at 135° C. at 23 mm., $n_D^{25}=1.4378$. This material has a fruity, ambrette-like note, and is useful as an odor-imparting agent. It is comprised essentially of the esters having Formula VI above formed by isobutyric acid with alkenols of empirical formula $C_{10}H_{20}O$.

Example 11

108 g. of 1-acetoxy-3-hydroxy-3,7-dimethyl-octane and 300 cm. of 48 percent aqueous hydrobromic acid were mixed together for one hour at room temperature. The oil layer in the reaction mixture was separated, washed with water, and dried over calcium chloride to yield 1-acetoxy-3-bromo-3,7-dimethyl-octane.

125 g. of 1-acetoxy-3-bromo-3,7-dimethyl-octane was dehydrohalogenated by heating with pyridine in toluene solution, in the manner described in Example 8 above. The product obtained, $n_D^{25}=1.439$, was essentially the same as that of Example 8.

Example 12

To a 2-liter, 3-necked flask, equipped with a stirrer and a thermometer, there were added 540 g. of 5,6-dimethyl-2-heptanone and 580 g. of ethylchloroacetate. The solution was cooled to −10° C., then 308 g. of sodium methylate was added portionwise, while stirring, in five hours. During the addition, the temperature was kept at −10 to 0° C. The mixture was stirred overnight, allowing it to warm up to room temperature. The mixture was then washed, dried over anhydrous calcium sulfate, and distilled under vacuum. The ethyl 3,6,7-trimethyl-2,3-epoxy-1-octanoate which was obtained boiled at 89–91° C. at 0.75 mm., $n_D^{25}=1.440$.

Example 13

In a 12-liter, 3-necked flask equipped with a stirrer, dropping funnel and thermometer, there were charged 90 g. of lithium aluminum hydride and 5 liters of diethyl ether. To the stirred suspension there was added at 0° C. a solution of 591 g. of ethyl 3,6,7-trimethyl-2,3-epoxy-1-octanoate in three liters of diethyl ether. The addition was completed in 4 hours, and the stirring was continued four hours longer, maintaining the temperature at 0° to 10° C. Excess lithium aluminum hydride was carefully decomposed by adding 100 cc. of ethyl acetate. The mixture was then poured into a 10% aqueous solution of sulfuric acid in order to dissolve the aluminum hydroxide formed. The oil layer was separated, and the aqueous layer was extracted three times, each time with one liter of petroleum ether. The combined oil layers were washed well and the solvents were removed at reduced pressure. The 3,6,7-trimethyl-1,3-octanediol which was obtained had $n_D^{25}=1.456$.

Example 14

In a 5-liter, 3-necked flask fitted with a stirrer, thermometer and dropping funnel there were charged 491 g. of 3,6,7-trimethyl-1,3-octanediol, 2 liters of petroleum ether and 950 cc. of dimethylaniline. The solution was cooled to −10° C. From a dropping funnel there was added, while stirring, 264 cc. of acetyl chloride in two hours. The cooling bath was then removed and the stirring was continued four additional hours, allowing the temperature to rise to room temperature. The mixture was washed well and the solvent was removed under vacuum. The 1-acetoxy-3,6,7-trimethyl-3-hydroxy-octane distilled at 110° C. at 0.4 mm., $n_D^{25}=1.446$.

Example 15

In a 2-liter flask fitted with a stirrer, condenser, thermometer and a dropping funnel, there were charged 565 cc. of pyridine, 150 cc. toluene and 92 cc. of phosphorus oxychloride. 161 g. of 1-acetoxy-3,6,7-trimethyl-3-hydroxy-octane was added from a dropping funnel in one hour, while stirring. The solution of 1-acetoxy-3-dichlorophosphato-3,6,7-trimethyl-octane thus formed was used directly for the procedure described in Example 16.

Example 16

The reaction flask containing the solution produced in Example 15 was heated at 95–100° C. for 4 hours while stirring. After cooling to room temperature, 500 cc. of ice water was cautiously added. The oil layer was removed and washed well, the solvent was distilled off at 100 mm. pressure, and the product was fractionated under vacuum. The main fraction distilled at 59–61° C. at 0.1 mm., $n_D^{25}=1.4450$. This material has an odor reminiscent of roses and musk, but with fruit accents, and can be used as an odor-imparting agent for perfumes. This material is comprised essentially of esters having Formula VI above formed by acetic acid with alkenols of empirical formula $C_{11}H_{22}O$.

Example 17

In a one-liter flask fitted with a thermometer and dropping funnel, there were placed 111 g. of the above identified product of Example 16 having $n_D^{25}=1.4450$, 300 cc. of ethyl alcohol, and a solution of 60 g. of potassium hydroxide in 120 cc. of water. The solution was stirred for four hours at 40° C. One liter of water was stirred in and the oil layer which separated was removed. The aqueous layer was extracted twice, each time with 500 cc. of petroleum ether. The combined extracts and oil layer were water-washed until neutral. The solvent was removed and the product was fractionated under vacuum. The main fraction distilled at 58° C. at 0.1 mm., $n_D^{25}=1.457$. This material comprised essentially acyclic monohydric mono-olefinic alcohols of the Formula VII above and having the empirical constitution $C_{11}H_{22}O$.

Example 18

In a one-liter flask equipped with a stirrer and a thermometer, there was placed 100 g. of 1-acetoxy-3,6,7-trimethyl-3-hydroxy-octane and 400 cc. of 37% hydrochloric acid. The mixture was stirred for one hour at room temperature. The oil layer was separated from the aqueous layer, washed twice with water and dried over calcium chloride to yield 1-acetoxy-3-chloro-3,6,7-trimethyl-octane.

*Example 19*

The total amount of 1-acetoxy-3-chloro-3,6,7-trimethyloctane produced in Example 18 was placed in a two-liter flask provided with a stirrer, thermometer and a reflux condenser. To this was added 300 cc. of pyridine and 150 cc. of toluene. The mixture was stirred at 95–100° C. for 48 hours. The reaction mixture was allowed to cool, and was then washed twice, each time with 500 cc. of water. After removing the solvent under vacuum, the product was fractionated. The main fraction distilled at 59–60° C. at 0.1 mm., $n_D^{25}=1.445$, and was essentially the same as the ester material obtained in Example 16 above.

*Example 20*

A solution of 100 g. of the same material having $n_D^{25}=1.457$ obtained in the main fraction in Example 17 above, 110 g. of formic acid and 400 cc. of petroleum ether was stirred at reflux temperature for two hours. The cooled reaction mixture was washed with water, with aqueous sodium bicarbonate solution and finally with water. On fractionation, there was obtained a material distilling at 120° C. at 22 mm., $n_D^{25}=1.4460$. This material has a delicate rose odor, and is useful as an odor-imparting agent. It is comprised essentially of esters having the Formula VI above formed by formic acid with alkenols of empirical formula $C_{11}H_{22}O$.

*Example 21*

85 g. of the same material having $n_D^{25}=1.457$ obtained in the main fraction in Example 17 above, 119 g. of isobutyric anhydride and 160 cc. of pyridine were stirred together at 60° C. for two hours. The cooled solution was washed with water, 5% aqueous sulfuric acid, 5% aqueous sodium carbonate and finally with water. The product was dried over anhydrous calcium sulfate and fractionated. There was obtained 83 g. of material distilling at 141° C. at 21 mm., $n_D^{25}=1.4440$. This material has a fruity, ambrette-like note, and is useful as an odor-imparting agent in the preparation of perfumes. It is comprised essentially of esters having the Formula VI above formed by isobutyric acid with alkenols of empirical formula $C_{11}H_{22}O$.

This application is a continuation-in-part of my prior copending applications Serial No. 407,179, filed January 29, 1954; Serial No. 415,447, filed March 10, 1954; Serial Nos. 459,864 and 459,865, both filed October 1, 1954; the benefit of the filing date of all these prior copending applications being claimed.

I claim:

1. A process which comprises heating in the presence of an acid acceptor a solution of a mixed organic-inorganic ester having the formula

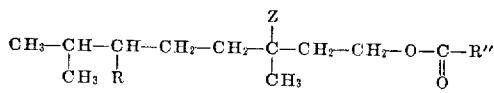

wherein R represents a radical selected from the group consisting of hydrogen and methyl; R″ represents a member selected from the group consisting of hydrogen and alkyl radicals having not more than six carbon atoms; and Z represents a radical selected from the group consisting of chloro, bromo and dichlorophosphato; thereby producing a mixture of three isomeric esters, respectively represented by the formulas

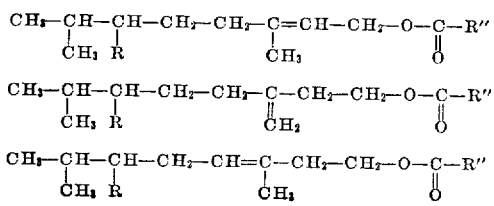

wherein R and R″ each has the same meaning indicated above.

2. A mixture of three isomeric esters, respectively represented by the formulas

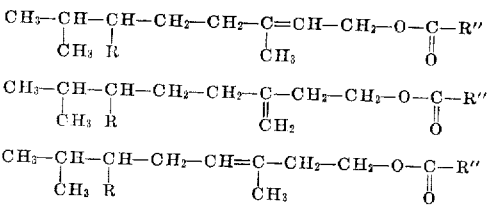

wherein R represents a radical selected from the group consisting of hydrogen and methyl; and R″ represents a member selected from the group consisting of hydrogen and alkyl radicals having not more than six carbon atoms; said mixture of isomeric esters being produced by the process of claim 1.

3. A process which comprises heating in the presence of an acid acceptor a solution of a mixed organic-inorganic ester having the formula

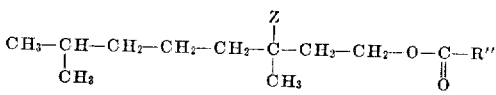

wherein R″ represents a member selected from the group consisting of hydrogen and alkyl radicals having not more than six carbon atoms; and Z represents a radical selected from the group consisting of chloro, bromo and dichlorophosphato; thereby producing a mixture of three isomeric esters, respectively represented by the formulas

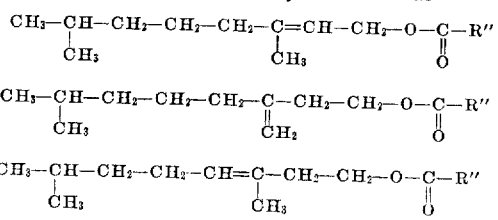

wherein R″ represents a member selected from the group consisting of hydrogen and alkyl radicals having not more than six carbon atoms.

4. A mixture of three isomeric esters respectively represented by the formulas

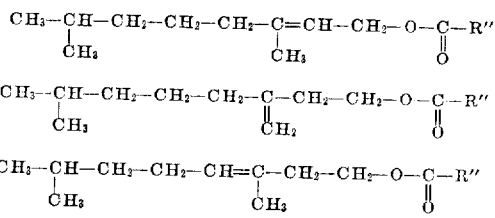

wherein R″ represents a member selected from the group consisting of hydrogen and alkyl radicals having not more than six carbon atoms; said mixture being produced by the process of claim 3.

5. A mixture according to claim 4, wherein each R″ represents the isopropyl radical.

6. A process which comprises heating in the presence of an acid acceptor a solution of a mixed organic-inorganic ester having the formula

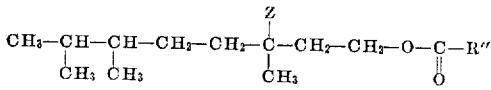

wherein R″ represents a member selected from the group consisting of hydrogen and alkyl radicals having not more than six carbon atoms; and Z represents a radical selected from the group consisting of chloro, bromo and dichlorophosphato; thereby producing a mixture of three isomeric esters, respectively represented by the formulas

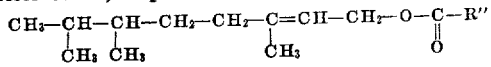
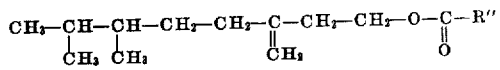
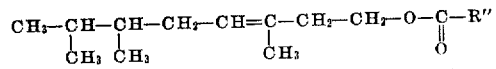

wherein R" represents a member selected from the group consisting of hydrogen and alkyl radicals having not more than six carbon atoms.

7. A mixture of three isomeric esters respectively represented by the formulas

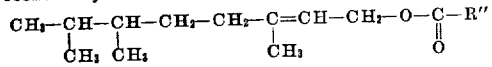
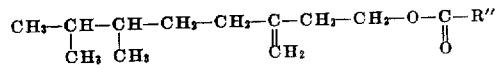
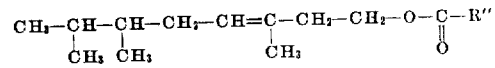

wherein R" represents a member selected from the group consisting of hydrogen and alkyl radicals having not more than six carbon atoms; said mixture being produced by the process of claim 6.

8. A mixture according to claim 7, wherein each R" represents the isopropyl radical.

9. A process which comprises heating a solution of 1-lower alkanoyloxy-3-dichlorophosphato - 3,7 - dimethyl-octane with an acid acceptor thereby eliminating the elements of dichlorophosphoric acid and producing a mixture of three isomeric esters, each of which esters has the formula

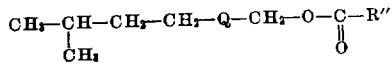

wherein Q represents a branched chain alkenylene radical having the empirical formula —$C_4H_6$—; and R" represents a member selected from the group consisting of hydrogen and alkyl radicals having not more than six carbon atoms.

10. A process which comprises heating a solution of 1-lower alkanoyloxy-3-dichlorophosphato-3,6,7-trimethyl-octane with an acid acceptor thereby eliminating the elements of dichlorophosphoric acid and producing a mixture of three isomeric esters, each of which esters has the formula

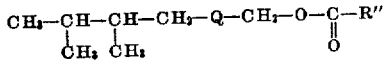

wherein Q represents a branched chain alkenylene radical having the empirical formula —$C_4H_6$—; and R" represents a member selected from the group consisting of hydrogen and alkyl radicals having not more than six carbon atoms.

References Cited in the file of this patent

Locquin et al.: Compt. Rend. 174 (1922), 1711–13.
Braun et al.: Ber. Deut. Chem. 57B (1924), 381–2.
Cason et al.: Chem. Abst. 42 (1948), 4926.

UNITED STATES PATENT OFFICE

CERTIFICATE OF CORRECTION

Patent No. 2,806,874                                September 17, 1957

Joseph Donald Surmatis

It is hereby certified that error appears in the printed specification of the above numbered patent requiring correction and that the said Letters Patent should read as corrected below.

Column 1, line 33, after the formula insert a period; column 2, line 40, after the formula insert a comma; column 5, line 23, for "acide" read --acid--; line 43, for "300 cm." read --300 cc.--; column 6, line 46, for "fruit" read --fruity--.

Signed and sealed this 3rd day of December 1957.

(SEAL)
Attest:

KARL H. AXLINE                                      ROBERT C. WATSON
                                                    Commissioner of Patents
Attesting Officer